United States Patent [19]

Kondoh et al.

[11] Patent Number: 5,518,519
[45] Date of Patent: May 21, 1996

[54] SINTERED CONTACT COMPONENT

[75] Inventors: Katsuyoshi Kondoh; Yoshishige Takano, both of Itami, Japan

[73] Assignee: Sumitomo Electric Industries, Ltd., Osaka, Japan

[21] Appl. No.: 506,566

[22] Filed: Jul. 25, 1995

[30] Foreign Application Priority Data

Jul. 30, 1994 [JP] Japan .................... 6-197985
Jul. 3, 1995 [JP] Japan .................... 7-191311

[51] Int. Cl.$^6$ ............................................. C22C 29/00
[52] U.S. Cl. ........................ 75/231; 420/470; 420/495
[58] Field of Search ............................ 75/231; 420/470, 420/495

[56] References Cited

U.S. PATENT DOCUMENTS

5,460,639  10/1995  Kondoh ........................ 75/231

Primary Examiner—Donald P. Walsh
Assistant Examiner—Anthony R. Chi
Attorney, Agent, or Firm—Wenderoth, Lind & Ponack

[57] ABSTRACT

The invention concerns copper-based sintered components for use as contact components such as clutches and brakes and is intended to provide a sintered component comprising hard particles admixed with and finely and uniformly dispersed in a primary particle of a matrix to provide improved friction coefficient, and in which the dispersed hard particles are inhibited from coming off the Cu—Sn alloy matrix during contact movement so that the sintered component is possessed of good friction contact characteristics and improved mechanical properties under dry and wet conditions. The sintered contact component comprises a copper-based sintered alloy having a structure such that 15 to 25 wt % of a hard particulate material having a maximum particle diameter of not more than 15 μm and a mean particle diameter of not more than 5 μm is uniformly dispersed within copper particles in an alloy matrix.

14 Claims, 3 Drawing Sheets

FIG. 1

(Friction test conditions)
  load: 25.0 kgf
  velocity: 10 m/sec
  friction time: 5 hrs.
  atomsphere: in the air (under dry conitions)

FIG. 2

(Friction test conditions)
  load: 125 kgf
  velocity: 0.1 m/sec–40 m/sec
  friction time: 5 hrs. continuous
  atomsphere: in the ATF (oil temp.;80°C)

SINTERED CONTACT COMPONENT

BACKGROUND OF THE INVENTION

1. Field of the Invention

The present invention relates to a copper-based sintered contact component which has exceptional resistance to wear and fusion and can stably retain a comparatively high coefficient of friction, say, about 0.4 to 0.6, under dry contact conditions. The component can stably exhibit a friction coefficient of more than 0.1 when placed in lubricating oil. Further, the component is very unlikely to attack counterpart material and has high strength, high toughness, and high hardness. Therefore, it is applicable for use in the art of contact components, such as clutches and brakes of both dry and wet types.

2. Description of the Prior Art

Recently, for use as materials for friction clutches and brakes to be used under dry conditions, bronze-based sintered alloys have been developed which can replace asbestos-based friction materials. For example, Japanese Patent Application Laid-Open No. 58-126948 describes a "dry sintered friction material" which comprises a bronze-based sintered alloy and hard particulate matter added thereto to provide higher coefficient of friction.

However, such sintered material has no reaction layer between the hard particulate matter dispersed in the alloy and the matrix, but involves gaps therebetween. As such, during friction contact under high-speed, high-load contact conditions, hard particles may come off the matrix, and this makes it impracticable to expect any high friction coefficient to be stably exhibited. Another problem is that fusion may occur relative to counterpart material starting from the point at which such particle fall-off has occurred. A further problem is come-off particle bite and attack against counterpart material.

Additionally, in the aspect of mechanical characteristics, the sintered material as an abrasion material involves the problem that aforesaid gaps will deteriorate the mechanical characteristics of the material, such as strength, toughness and hardness. Another problem is that the dispersed hard particles are diametrically large-sized on the order of 30 to 80 μm, which fact, as a source of fracture, will induce deterioration in strength and toughness.

Conventional wet friction materials which have generally been used are porous paper-made friction materials and/or carbon sintered materials. As an example of the first mentioned type, reference may be made to Japanese Patent Application Laid-Open No. 6-25653 which describes a "paper friction material" composed principally of a thermosetting resin, such as phenolic resin, and friction adjustors, such as graphite powder and organic dust, with organic fibers and carbon fibers used as reinforcements. For the latter mentioned type, reference may be made to Japanese Patent Application Laid-Open No. 4-76086 entitled "Wet Friction Material" in which is proposed a carbon fiber-reinforced carbon sintered body produced by sintering a composite composed of uncarbonized carbonaceous fibers and carbonaceous powder. Materials of the both types are elastically deformable, and this enables any biased engagement force to be absorbed on the friction material side.

Generally, however, such friction material, when held in oil, has a small coefficient of friction only on the order of 0.1 to 0.15. Therefore, in order that a clutch, for example, may provide any sufficient transmission torque, it is necessary that a friction material having larger diameter and larger surface area be used. As a result, the current need for size/weight reduction cannot be met. Further, the paper friction material lacks heat resistance. During friction contact under high temperature conditions, therefore, such friction material may become damaged due to frictional wear and may also be subject to deterioration in its characteristics, which will lower the friction coefficient of the friction material further.

In an attempt to overcome these problems, Japanese Patent Application Laid-Open No. 4-76086, entitled "Friction Material", proposes a friction material such that a pseudoalloy spray coating comprised of two kinds of metal is formed on the contact surface of a friction material (glass fiber and/or rubber binder), whereby the friction material can have a high friction coefficient of the order of more than 0.25.

According to this technique, however, the process of spray coating is required in addition to the placement of the friction material on a substrate. This poses a problem because it adds to costs and process complexity. Further, because of the fact that thermal spraying is required, it is impracticable to expect any good productivity with the method.

Conventionally, bronze-based (copper-tin) sintered alloys have been used as oilless bearing materials. Sintered alloys of this type have high abrasion resistance and high fusion resistance. Therefore, it may be expected that a friction material comprised of such a sintered alloy with hard particles loaded and dispersed therein would exhibit a high coefficient of friction without being liable to any damage due to friction.

As already stated, however, it has been found that since hard particles loaded are present in grain boundaries of the matrix bronze powder, during friction contact, such particles would fall off and even attack the counterpart material, and that the sintered material per se would be subject to fusion and frictional wear. Another problem is that since bearing-type sintered alloys have many vacancies dispersed in their interior, in a high slide velocity range in excess of 20 m/sec, for example, lubricating oil present within the sintered alloy flows out of the interior so that an oil reservoir may be formed in a vacancy in the contact surface. As a consequence, a thick oil film is formed between the contact surface of the friction material and the counterpart material, with the result that the friction coefficient of the friction material is lowered to a 0.01–0.02 level.

SUMMARY OF THE INVENTION

In order to overcome the foregoing problems, the present invention is directed to economically manufacturing a sintered component comprising hard particles admixed with and finely and uniformly dispersed in a primary particle of a matrix to provide improved friction coefficient under dry and wet contact conditions, and in which the dispersed hard particles are inhibited from coming off the Cu—Sn alloy matrix during contact movement so that the sintered component is possessed of good friction contact characteristics and improved mechanical properties.

Accordingly, in order to solve the foregoing problems, the present inventors conducted extensive experiments and studies and, as a result, they developed a high-strength sintered contact component which can stably retain high friction coefficient under dry and wet friction contact conditions and is, therefore, free of the possibility of attacking counterpart material, and which is less liable to wear due to friction and unlikely to involve fusion relative to the counterpart material.

Specifically, according to the invention, alloy compositions of sintered contact components and method of making the same are as stated below.

(1) A sintered contact component comprising a copper-based sintered alloy having a structure such that 15 to 25 wt % of a hard particulate material having a maximum particle diameter of not more than 15 μm and a mean particle diameter of not more than 5 μm is uniformly dispersed in former powder particles within an alloy matrix, the sintered contact component having a friction coefficient of not less than 0.4 when in contact with steel material under dry ambient conditions and a friction coefficient of not less than 0.1 when in contact with steel material in lubricating oil.

(2) A sintered contact component as set forth in (1) above, wherein when the component comes into contact with steel material under dry ambient conditions, the difference between its coefficient of static friction and its coefficient of dynamic friction is not more than 0.1.

(3) A sintered contact component as set forth in (1) above, wherein the copper-based sintered alloy comprises vacancies having a mean diameter of not more than 30 μm which are uniformly dispersed within the alloy in a range of from 1 vol % to 30 vol %.

(4) A sintered contact component as set forth in (1) above, wherein the matrix of the copper-based sintered alloy comprises 3 to 20 wt % of Sn, with the balance being made up substantially of Cu and unavoidable impurities.

(5) A sintered contact component as set forth in (1) above, wherein the hard particulate material is composed of at least one, or more than one, of iron-based intermetallic compounds including FeMo, FeCr, FeTi, FeW, and FeB.

(6) A sintered contact component as set forth in (1) above, wherein the copper-based sintered alloy contains not more than 3 wt % of a solid lubricating material as required.

(7) A sintered contact component as set forth in (6) above, wherein the solid lubricating material is composed of at least one, or more than one, of spherical graphite, $MoS_2$, $CaF_2$ and BN.

(8) A sintered contact component as set forth in (1) above, wherein the copper-based sintered alloy contains not more than 15 wt % of natural scaly graphite powder, or expanded graphite powder that is converted from natural scaly graphite powder by expanding the same in the direction of thickness, as required.

(9) A sintered contact component as set forth in (1) above, wherein the copper-based sintered alloy is made from a hard-particle dispersed composite copper alloy powder comprising a mixture powder consisting of a Cu—Sn alloy powder containing 3 to 20 wt % of Sn, with the balance being substantially made up of Cu and unavoidable impurities, and 15 to 25 wt % of a hard particulate material, the mixture powder being subjected to the process of mixing and milling by one of the mechanical alloying, mechanical grinding, and pulverizing techniques so that the hard particulate material is pulverized to a maximum particle size of not more than 15 μm and a mean particle size of 5 μm and is uniformly dispersed in the Cu—Sn alloy matrix.

(10) A sintered contact component as set forth in (1) or (9) above, wherein the copper-based sintered alloy is made from a mixture powder consisting of the hard particle-dispersed composite copper alloy powder and not more than 3 wt % of a solid lubricating material.

(11) A sintered contact component as set forth in (9) above, wherein the copper-based sintered alloy is made from the hard-particle dispersed composite copper alloy powder and, in combination therewith, not more than 15 wt % of natural scaly graphite powder, or expanded graphite powder that is converted from natural scaly graphite powder by expanding the same in the direction of thickness.

(12) A sintered contact component as set forth in (1) above, wherein the copper-based sintered alloy is made from a hard-particle dispersed composite copper alloy powder comprising a mixture powder consisting of 3 to 20 wt % of Sn, and 15 to 25 wt % of hard particulate material, with the balance being substantially made up of Cu and unavoidable impurities, the mixture powder being subjected to the process of mixing and milling by one of the mechanical alloying, mechanical grinding, and pulverizing techniques so that the hard particulate material is pulverized to a maximum particle size of not more than 15 μm and a mean particle size of 5 μm and is uniformly dispersed in the Cu—Sn alloy matrix.

(13) A sintered contact component as set forth in (1) or (12) above, wherein the copper-based sintered alloy is made from a mixture powder comprising the hard-particle dispersed composite copper alloy powder and not more than 3 wt % of solid lubricating material.

(14) A sintered contact component as set forth in (12) above, wherein the copper-based sintered alloy is made from a mixture powder comprising the hard-particle dispersed composite copper alloy powder and not more than 15 wt % of natural scaly graphite particles, or expanded graphite powder that is converted from natural scaly graphite particles by expanding the same in the direction of thickness.

Next, the reasons why the alloy compositions and the proportion of vacancies in the foregoing copper-based sintered alloys are set as above stated will be explained.

(1) Sn

Sn, together with Cu, forms the matrix of the alloy and can enhance high temperature strength and toughness of the alloy. It also can improve fusion resistance of the alloy relative to counterpart material at elevated temperatures. If the proportion of Sn is less than 3 wt %, no such effect can be obtained, while if Sn is added in excess of 20 wt %, precipitation of a hard and brittle phase will occur, resulting in deterioration in strength and toughness. Therefore, the proportion of Sn is set within the range of 3 to 20 wt %.

(2) Hard particles (iron-based intermetallic compound)

Hard particles are finely and uniformly dispersed in a primary particle of the matrix of the sintered alloy and can inhibit adhesion of the alloy with counterpart material under dry and wet friction conditions at ordinary and elevated temperatures, thereby improving the fusion resistance of the sintered alloy. Also, they come in direct contact with counterpart material surface to provide increased coefficient of friction, thereby enhancing the wear resistance of the sintered alloy.

The particle size and proportion of such particulate material will have the following effects. If the proportion of hard particles is less than 15 wt %, no improvement in wear resistance can be obtained. If the maximum particle size is greater than 15 μm or the mean particle size is greater than 5 μm, or if the proportion of hard particles is more than 25 wt %, the hard particles are likely to become a starting point at which cracking will occur, thus resulting in deterioration in the strength and toughness of the sintered material. Also, from the view point of counterpart attack possibility, addition of hard particles at such particle size and quantity levels is undesirable because it results in considerable wear being caused to the counterpart material.

When the sintered material contains 15 to 25 wt % of hard particles having a particle size range of up to 15 μm, with a mean particle size of not more than 5 μm, which are finely and uniformly dispersed in a primary particle of the matrix, the sintered material can have good stability in friction coefficient. Preferably, therefore, the hard particles have a particle size range of up to 15 μm maximum, with a mean particle size of not more than 5 μ m, and the total hard particle content is 15 to 25 wt %.

The iron-based intermetallic compound is preferably comprised of at least one, or more than one, of FeMo, FeCr, FeTi, FeW, and FeB. Besides iron-based intermetallic compounds, metallic oxides, such as $Al_2O_3$, $SiO_2$, and $ZrO_2$, and ceramics, such as SiC and AlN, may be effective for friction coefficient improvement, but particles of these are less machinable as compared with particles of iron-based intermetallic compounds, which fact poses a problem from the view point of economy. Therefore, use of iron-based intermetallic compounds is preferred for purposes of the contact component of the invention.

However, if such iron-based intermetallic compound comes off the matrix during contact movement, there will develop particle transfer and/or adhesion relative to counterpart material starting from the location of such particle separation. Another problem is that any separated particle may bite into the counterpart material to cause wear and/or damage to the counterpart material. Therefore, in order to avoid any such occurrence so as to ensure constantly stable, high coefficient of friction, it is required that particulate intermetallic compound be uniformly dispersed in a primary particle of the matrix and particles thereof be inhibited from coming off the matrix.

A specific method therefor is as follows. That is, the intermetallic compound is mechanically alloyed with a Cu—Sn-based alloy powder or a powder mixture of Su and Sn, whereby the intermetallic compound as ground to a particle size of up to 15 μm, maximum, with a mean particle size of 5 μm, can be finely and uniformly dispersed in the Cu—Sn-based alloy particles. After compacting, molding and sintering of the powder, a reaction layer is formed at the interface between the Cu—Sn-based alloy of the matrix and the intermetallic compound, whereby the intermetallic compound can be firmly immobilized in the matrix. Specifically, it has been found that only by employing mechanical powder mixing/grinding techniques, such as mechanical alloying, mechanical grinding, and pelletizing, is it possible to obtain a Cu—Sn-based alloy powder such that intermetallic compound particles are finely and uniformly dispersed in a particulate mass of the Cu—Sn-based alloy powder so that they are unlikely to come off sintered matrix during contact movement.

It is noted that such mechanical powder mixing is carried out in dry process, and not in wet process as in conventional ball milling or mixing. In some cases, stearic acid or alcohol, as a PCA (process control agent), may be added in a small quantity in order to prevent excessive agglomeration. For carrying out the process, an ATTORITOR unit or ball mill may be suitably employed. The former is suited for high-speed processing because it exhibits high grinding efficiency. The latter involves prolonged grinding operation but permits easy atmosphere control and has a relatively good advantage in respect of economy, only if the arrangement for input energy is properly designed.

(3) Solid lubricating ingredient

The solid lubricating ingredient is effective in correcting the counterpart attack behavior of a sintered contact component under dry friction conditions and also in moderately stabilizing a comparatively high coefficient of the order of about 0.4 to 0.6 under dry contact conditions at elevated temperatures, whereby surface lubricity between contact surfaces can be enhanced, and whereby the problem of squeaks, vibrations and noisiness upon contact can be reasonably overcome.

If sliding velocity becomes higher under wet contact conditions, vacancies existing on the contact surface provide an wedging effect so that lubricating oil is taken into the vacancies to form a lubricating film in the contact interface between the sintered friction material and the counterpart steel material.

In particular, when the contact component is used at a high velocity level of more than 20 m, the component may be subject to variations/downward changes in friction coefficient. As a solution to such a problem, it is arranged that the sintered friction material contains solid lubricating material and this provides for improvement in the stability of friction coefficient relative to slide velocity.

In Cu—Sn-based sintered alloys, solid lubricating ingredients having these characteristic features are graphite, $MoS_2$, $CaF_2$, and BN which economically involve fewer problems. As another lubricating ingredient, Pb, for example, is used in Cu—Sn alloy-made bearings, but use of this material in a contact component involves falloff possibilities during contact movement because the material does not function to produce a compound in association with the matrix and is present in the form of fine particles in dendrite arm spacings of α phase. For effective use as such ingredient, at least one or more of graphite, $MoS_2$, $CaF_2$, and BN may be loaded in the amount of not more than 3 wt %. Use of the ingredient in excess of 3 wt % is undesirable because it would result in considerable deterioration in the strength and toughness of the sintered body.

However, the present inventors made attempts to use natural scaly graphite powder, a graphite powder material which is characteristically different from spheroidal graphite powder conventionally used in powder metallurgy, and/or expanded graphite powder as obtained by expanding the natural scaly graphite powder in the direction of thickness.

Specifically, scaly graphite powder, as compared with conventional spheroidal graphite powder, is characteristically advantageous in (1) moldability/compressibility and (2) lubricating performance. That is, whereas use of conventional spheroidal graphite powder in excess of 3 wt % of the total will result in some deterioration in the mechanical characteristics of the sintered body, scaly graphite powder or expanded graphite powder, if it is loaded up to 15 wt %, will not induce any such decrease in the mechanical characteristics of the sintered body. Additionally, because of its good lubricating performance, scaly graphite powder can more effectively inhibit such troubles as noisiness, vibrations and squeaks which may occur during contact movement as earlier mentioned. Also, scaly graphite powder helps improve the conformability of the contact component with the counterpart material at an initial contact stage and better stabilize the friction coefficient of the contact component.

Furthermore, where such graphite powder is dispersed in a sintered body, good compressibility of the graphite powder can be advantageously utilized for compressibility improvement of the sintered body itself when subjected to pressure, so that local contact with the contact surface of the counterpart material can be inhibited and thus full contact can be allowed, whereby stable friction contact performance may be assured.

Therefore, a sintered body fabricated by mixing and compacting a hard-particle dispersed composite copper alloy powder, a main feature of the invention, and aforesaid scaly graphite powder or expanded graphite powder, or both of them, can exhibit more improved mechanical properties and friction contact properties; more particularly it can exhibit a stable coefficient of friction continually from an initial stage of contact movement.

(4) Vacancy

Vacancies are of a size of not more than 30 μm and are uniformly distributed over the friction contact surface of the sintered alloy, so that they are subject to deformation upon surface contact and will produce wedging effect to allow air flow into the vacancies during contact movement, which in turn will produce buoyancy. Therefore, under dry contact conditions, vacancies provide good fusion resistance and improved adaptability relative to counterpart component. Under wet contact conditions, aforesaid self-lubricating effect permits an oil reservoir (oil film) to be formed in vacancies, whereby improved fusion resistance can be obtained.

A vacancy size greater than 30 μm may be a cause of cracking and results in considerable decrease in the strength and toughness of the sintered product. If the volume of vacancies is less than 1 vol %, the above mentioned advantage is unlikely to be obtained. If vacancies are distributed in excess of 30 vol %, the strength and toughness of the sintered alloy may be lowered. If vacancies are unevenly distributed, the conformability of the sintered alloy relative to counterpart material will be locally reduced; therefore, no stable friction coefficient can be obtained and, in addition, fusion with the counterpart material is likely to occur. In the sintered contact component of the invention, therefore, it is desirable that vacancies should have a size of not more than 30 μm and be uniformly distributed within a range of 1 to 30 vol % in the contact component. For the purpose of the present invention, above specified vacancy size and volume can be attained by controlling the working pressure during the process of powder pressing and molding.

Sintered contact components having the above mentioned alloy composition and made according to the foregoing method have mechanical properties, such as strength, toughness and hardness, and also friction resistance and self-lubricating property, which are sufficient to qualify such contact component for use singly as structural material without reinforcement. Under dry friction contact conditions, conventional Cu—Sn-based alloys, under dry friction contact conditions, have a friction coefficient range of about 0.2 to 0.3 during an initial contact period and, under wet friction contact conditions, have a friction coefficient range of 0.02 to 0.05. As friction progresses, the friction coefficient of such alloy tends to change upward and finally the sintered alloy goes into fusion with counterpart material or the alloy itself gets worn.

In contrast to this, the sintered contact component of the invention can stably retain a comparatively high friction coefficient, say about 0.4 to 0.6 under dry contact conditions and about 0.1 or more under wet contact conditions. Furthermore, it will never attack the counterpart material, nor will it be liable to fusion with or friction wear/damage relative to the counterpart.

DETAILED DESCRIPTION OF THE PREFERRED EMBODIMENTS

Embodiments of the present invention will now be explained with reference to the accompanying drawings.

Alloy compositions of sintered contact components according to the invention and of comparative materials are shown in Table 1. Mechanical characteristics of the sintered contact components, and abrasion test results (friction coefficient and quantities of wear with respect to sintered materials and counterpart material SS41) are shown in Table 2.

Figure 1:
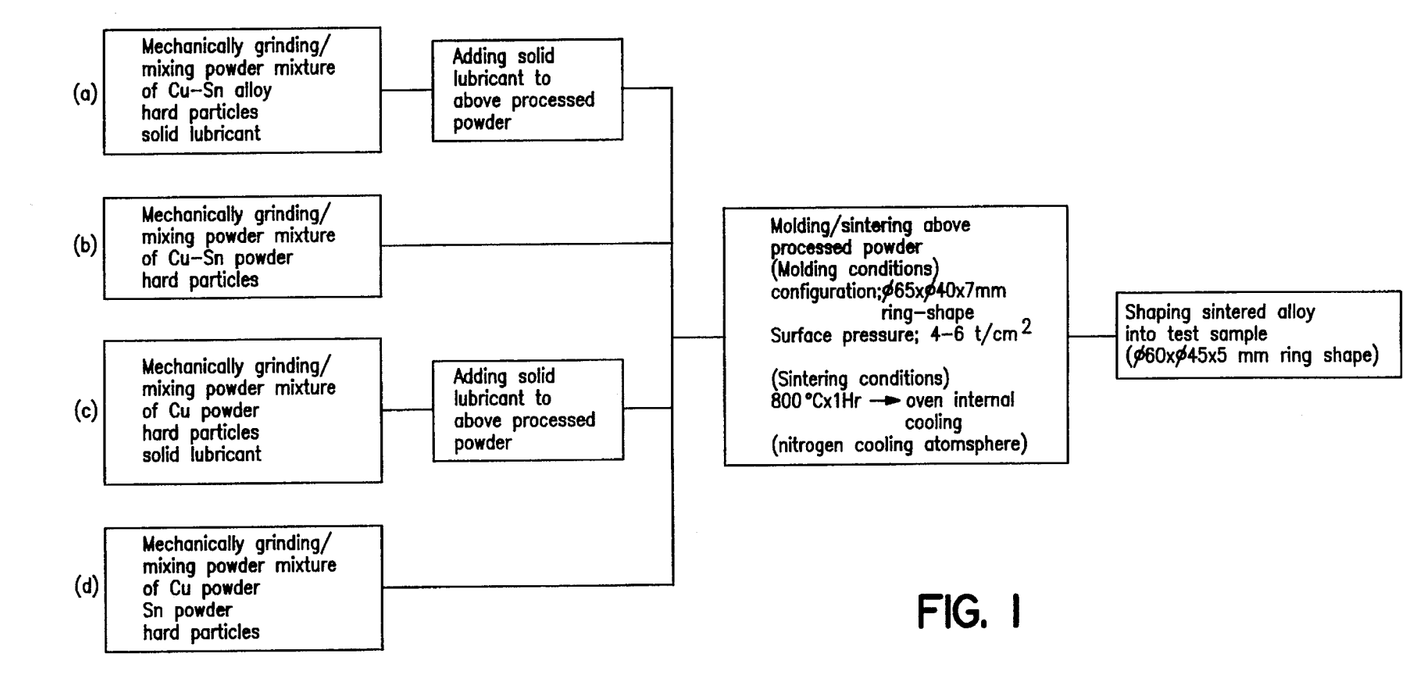
FIG. 1 is a flow chart showing the process of making sintered contact components according to the present invention.

Sample powders were molded and sintered under manufacturing conditions according to the respective processes shown in FIG. 1. (In the figure, "Mechanical grinding/mixing" means mechanical alloying, mechanical mixing, and pelletizing.) Abrasion tests were carried out employing the dry abrasion tester shown in FIG. 2. For friction coefficient values, measurements were made at time intervals of one minute beginning from the start of testing, and stable measurements are shown in the table.

In the table, Nos. 1 through 17 represent sintered components of the invention, while Nos. 18 through 28 represent comparative materials. It is noted that only vacancy measurements are expressed in vol % and all other measurements are expressed in wt %. Symbols A, B, C and D for solid lubricating ingredients signify respectively: A for graphite, B for $MoS_2$, C for $CaF_2$, and D for BN.

In Table 1, Remarks *1, *2 and *3 mean as follows:

*1) An alloy produced by subjecting a mixed powder to mechanical grinding/mixing according to the process (a) in FIG. 1, with grinding conditions being changed so that the dispersed hard particles or Fe-based intermetallic compound particles were ground to a mean particle size of 15 μm, and by molding and sintering the so treated mixture.

*2) An alloy produced by subjecting a mixed powder to mechanical grinding/mixing according to the process (a) in FIG. 1, with surface pressure conditions during the stage of powder molding being changed so that vacancies distributed in the powder molded product were sized 45 μm mean, and by sintering the so treated mixture.

*3) An alloy produced by simply mixing various powders having prescribed compositions without subjecting them to the process of mechanical grinding/mixing, such as mechanical alloying, mechanical mixing, or pelletizing, and then sintering the mixture.

TABLE 1

| No. | Process | Sn | Hard Particle | | | | | | Solid Lubricant | | | | | Vacancy vol % | Cu | Remark |
| | | | FeMo | FeCr | FeW | FeTi | FeB | Total | A | B | C | D | Total | | | |
|---|---|---|---|---|---|---|---|---|---|---|---|---|---|---|---|---|
| 1 | a | 10 | 20 | 0 | 0 | 0 | 0 | 20 | 1 | 0 | 0 | 0 | 1 | 18 | Balance | |
| 2 | a | 10 | 0 | 20 | 0 | 0 | 0 | 20 | 1 | 0 | 0 | 0 | 1 | 18 | Balance | |
| 3 | a | 12 | 0 | 0 | 20 | 0 | 0 | 20 | 1 | 0 | 0 | 0 | 1 | 20 | Balance | |
| 4 | a | 10 | 0 | 0 | 0 | 20 | 0 | 20 | 1 | 0 | 0 | 0 | 1 | 20 | Balance | |
| 5 | a | 12 | 0 | 0 | 0 | 0 | 20 | 20 | 1 | 0 | 0 | 0 | 1 | 20 | Balance | |
| 6 | b | 10 | 15 | 0 | 0 | 0 | 0 | 15 | 1 | 0 | 0 | 0 | 1 | 15 | Balance | |
| 7 | c | 10 | 25 | 0 | 0 | 0 | 0 | 25 | 1 | 0 | 0 | 0 | 1 | 25 | Balance | |
| 8 | b | 10 | 10 | 10 | 0 | 0 | 0 | 20 | 1 | 0 | 0 | 0 | 1 | 25 | Balance | |
| 9 | c | 5 | 0 | 0 | 0 | 20 | 0 | 20 | 1 | 0 | 0 | 0 | 1 | 20 | Balance | |
| 10 | d | 15 | 20 | 0 | 0 | 0 | 0 | 20 | 0.5 | 0 | 0 | 0 | 0.5 | 20 | Balance | |
| 11 | d | 10 | 20 | 0 | 0 | 0 | 0 | 20 | 2 | 0 | 0 | 0 | 2 | 18 | Balance | |
| 12 | a | 12 | 20 | 0 | 0 | 0 | 0 | 20 | 3 | 0 | 0 | 0 | 3 | 5 | Balance | |
| 13 | a | 10 | 0 | 20 | 0 | 0 | 0 | 20 | 0 | 1 | 0 | 0 | 1 | 20 | Balance | |
| 14 | a | 10 | 20 | 0 | 0 | 0 | 0 | 20 | 0 | 1 | 0 | 1 | 2 | 17 | Balance | |
| 15 | b | 10 | 10 | 10 | 0 | 0 | 0 | 20 | 0 | 0 | 1 | 0 | 1 | 20 | Balance | |
| 16 | c | 10 | 20 | 0 | 0 | 0 | 0 | 20 | 0 | 0 | 1 | 1 | 2 | 14 | Balance | |
| 17 | a | 12 | 20 | 0 | 0 | 0 | 0 | 20 | 0.5 | 0.5 | 0 | 0 | 1 | 25 | Balance | |
| 18 | a | 2 | 20 | 0 | 0 | 0 | 0 | 20 | 1 | 0 | 0 | 0 | 1 | 10 | Balance | |
| 19 | a | 35 | 20 | 0 | 0 | 0 | 0 | 20 | 1 | 0 | 0 | 0 | 1 | 10 | Balance | |
| 20 | a | 10 | 10 | 0 | 0 | 0 | 0 | 10 | 1 | 0 | 0 | 0 | 1 | 10 | Balance | |
| 21 | a | 10 | 15 | 0 | 15 | 0 | 0 | 30 | 1 | 0 | 0 | 0 | 1 | 10 | Balance | |
| 22 | b | 10 | 20 | 0 | 0 | 0 | 0 | 20 | 0 | 0 | 0 | 0 | 0 | 10 | Balance | |
| 23 | b | 10 | 20 | 0 | 0 | 0 | 0 | 20 | 4 | 0 | 0 | 0 | 4 | 10 | Balance | |
| 24 | a | 10 | 20 | 0 | 0 | 0 | 0 | 20 | 1 | 0 | 0 | 0 | 1 | 0 | Balance | |
| 25 | a | 10 | 20 | 0 | 0 | 0 | 0 | 20 | 1 | 0 | 0 | 0 | 1 | 35 | Balance | |
| 26 | a | 10 | 20 | 0 | 0 | 0 | 0 | 20 | 1 | 0 | 0 | 0 | 1 | 20 | Balance | *1 |
| 27 | a | 10 | 20 | 0 | 0 | 0 | 0 | 20 | 1 | 0 | 0 | 0 | 1 | 20 | Balance | *2 |
| 28 | — | 10 | 20 | 0 | 0 | 0 | 0 | 20 | 1 | 0 | 0 | 0 | 1 | 20 | Balance | *3 |

(Sample of Invention: Nos. 1–17; Comprative Samples: Nos. 18–28)

TABLE 2

| Sample No. | Mechanical Property | | | Friction Contact Characteristic | | | | |
| | UTS MPa | Elongation % | Breaking strength MPa | μ value | Δ μ[1] | Wear[2] mg | | Damage Condition |
| | | | | | | Sintered material | SS41 | |
|---|---|---|---|---|---|---|---|---|
| 1 | 220 | 7.5 | 360 | 0.52 | 0.05 | 6 | 2 | No damage |
| 2 | 222 | 6.8 | 351 | 0.55 | 0.06 | 7 | 3 | No damage |
| 3 | 216 | 7.2 | 348 | 0.54 | 0.05 | 5 | 4 | No damage |
| 4 | 214 | 7.0 | 345 | 0.55 | 0.05 | 6 | 3 | No damage |
| 5 | 218 | 7.1 | 358 | 0.57 | 0.06 | 7 | 4 | No damage |
| 6 | 245 | 6.5 | 388 | 0.50 | 0.03 | 7 | 2 | No damage |
| 7 | 204 | 7.7 | 340 | 0.60 | 0.07 | 6 | 3 | No damage |
| 8 | 207 | 7.0 | 336 | 0.57 | 0.05 | 8 | 3 | No damage |
| 9 | 216 | 7.0 | 357 | 0.53 | 0.04 | 5 | 3 | No damage |
| 10 | 211 | 6.6 | 344 | 0.60 | 0.08 | 4 | 4 | No damage |
| 11 | 223 | 6.6 | 353 | 0.51 | 0.04 | 5 | 5 | No damage |
| 12 | 273 | 9.9 | 402 | 0.45 | 0.02 | 5 | 4 | No damage |
| 13 | 220 | 6.8 | 354 | 0.55 | 0.05 | 7 | 6 | No damage |
| 14 | 226 | 6.6 | 355 | 0.51 | 0.04 | 5 | 4 | No damage |
| 15 | 218 | 6.7 | 354 | 0.56 | 0.06 | 6 | 3 | No damage |
| 16 | 240 | 7.4 | 384 | 0.48 | 0.03 | 6 | 5 | No damage |
| 17 | 208 | 6.6 | 333 | 0.50 | 0.04 | 5 | 6 | No damage |
| 18 | 112 | 8.8 | 167 | 0.72 | 0.06 | $2 \times 10^3$ | 5 | Sintered material worn |
| 19 | 270 | 1.6 | 410 | 0.77 | 0.09 | 11 | 68 | SS41 attacked |
| 20 | 240 | 7.8 | 385 | 0.28 | 0.04 | 8 | 6 | No damage |
| 21 | 165 | 1.9 | 197 | 0.64 | 0.14 | 12 | 105 | SS41 attacked |
| 22 | 276 | 9.6 | 415 | 0.86 | 0.06 | $8 \times 10^3$ | $-6 \times 10^3$ | Fusion |
| 23 | 126 | 2.2 | 171 | 0.30 | 0.01 | 9 | 6 | No damage |
| 24 | 291 | 10.6 | 432 | 0.88 | 0.18 | $8 \times 10^3$ | $-5 \times 10^3$ | Fusion |
| 25 | 94 | 1.1 | 101 | 0.43 | 0.04 | $2 \times 10^3$ | 6 | Sintered material worn |
| 26 | 114 | 2.0 | 133 | 0.66 | 0.18 | 11 | 95 | SS41 attacked |
| 27 | 105 | 1.6 | 124 | 0.51 | 0.05 | $3 \times 10^3$ | 5 | Sintered material worn |
| 28 | 123 | 2.4 | 165 | 0.28 | 0.26 | $4 \times 10^3$ | $-3 \times 10^3$ | Fusion |

[1] Δ μ indicates the difference between static coefficients of friction and dynamic coefficient of friction.
[2] Minus (−) indicates gain due to deposition.

Material Nos. 1 through 17 represent alloys according to the invention, and their mechanical characteristics and the results of friction tests with them are satisfactory as shown in Table 2.

Test results with respect to comparative materials are as stated below.

18: Matrix strength is insufficient because the Sn content is as small as 2%, so that the friction material is worn away, which results in an increase in μ value.

19: The Sn content is as large as 35%, so that the matrix becomes so much hardened as to cause the friction material to attack the counterpart material, which results in an increase in μ value.

20: The hard particle content is as small as 10 wt so that any sufficient level of μ value cannot be attained.

21: The hard particle content is so large on the order of 30 wt %, so that any sufficient level of μ value cannot be attained.

22: Absence of solid lubricant causes lack of lubrication, which results in fusion with the counterpart material.

28. Since respective powders having specified ingredients are simply mixed without being subjected to mechanical grinding/mixing, followed by sintering, no reaction layer is formed between the hard particles and the matrix. This, coupled with the fact that there are present very coarse hard particles, causes hard particles to come off the matrix during contact movement, resulting in the trouble of fusion with the counterpart material and also in decreased strength and toughness with respect to the sintered alloy.

Figure 3:
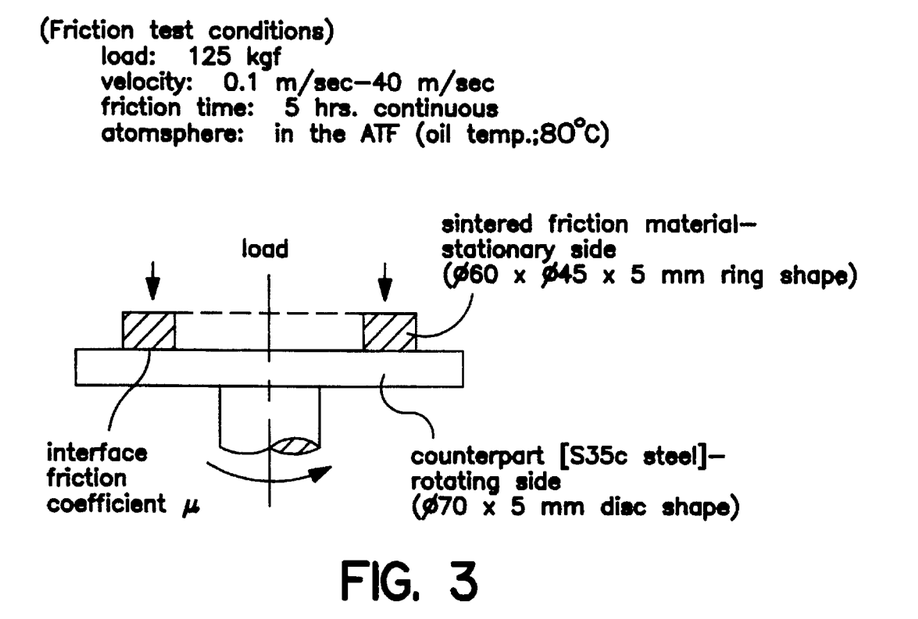
FIG. 3 is an explanatory view showing how wet friction tests are carried out with respect to sintered contact components of the invention.

Friction tests were carried out with respect to sintered contact materials of the present invention and comparative materials which were fabricated according to the individual alloy compositions and manufacturing methods as shown in Table 1. Results of the tests (friction coefficient relative to slide velocity, and wear of friction material and that of counterpart material S35C) are shown in Table 3. Abrasion tests were carried out employing the wet abrasion tester shown in FIG. 3. For friction coefficient values, measurements were made at time intervals of one minute beginning from the start of testing, and stable measurements are shown in the table.

TABLE 3

| | | | | Friction Contact Characteristic | | |
| --- | --- | --- | --- | --- | --- | --- |
| | | | | Wear[1] mg | | |
| Sample No. | Table 1 Sample No. | Slide speed m/sec | μ value | Sintered material | S35C | Damage Condition |
| 1 | 1 | 0.1 | 0.37 | 3 | 1 | No damage |
| 2 | 1 | 1 | 0.36 | 3 | 1 | No damage |
| 3 | 1 | 5 | 0.36 | 3 | 1 | No damage |
| 4 | 1 | 10 | 0.35 | 4 | 1 | No damage |
| 5 | 1 | 20 | 0.33 | 4 | 1 | No damage |
| 6 | 1 | 40 | 0.33 | 4 | 2 | No damage |
| 7 | 8 | 5 | 0.38 | 3 | 0 | No damage |
| 8 | 8 | 20 | 0.34 | 3 | 1 | No damage |
| 9 | 16 | 8 | 0.36 | 2 | 1 | No damage |
| 10 | 16 | 30 | 0.34 | 3 | 2 | No damage |
| 11 | 18 | 5 | 0.71 | $6 \times 10^2$ | $-5 \times 10^2$ | Sintered material: wear/fusion |
| 12 | 19 | 10 | 0.68 | 44 | $4 \times 10^2$ | S35C attacked/penetrated |
| 13 | 20 | 5 | 0.15 | 2 | 1 | No damage |
| 14 | 21 | 5 | 0.68 | 26 | $3 \times 10^2$ | S35C attacked |
| 15 | 22 | 40 | 0.1–0.3 | 8 | 5 | Friction coefficient fluctuate |
| 16 | 24 | 5 | 0.71 | $4 \times 10^2$ | $-2 \times 10^2$ | Fusion |
| 17 | 28 | 5 | 0.72 | $7 \times 10^3$ | $-5 \times 10^3$ | Sintered material: wear/fusion |
| 18 | 28 | 10 | 0.68 | $5 \times 10^3$ | $-2 \times 10^2$ | Sintered material: wear/fusion |

[1]Minus (−) indicates gain due to deposition

23: The proportion of solid lubricant is so large on the order of 4%, resulting in lowered strength and toughness characteristics.

24: Non-presence of vacancy results in reduced fusion resistance and occurrence of fusion with the counterpart material.

25. The presence of vacancies in such a large volume as 35% causes lack of strength and toughness, resulting in friction material wear.

26. Mean particle size of hard particles is as large as 15 μm, which results in decreased strength and toughness, and also in the trouble of the counterpart material being attacked.

27. Vacancy size is as large as 45 μm mean, which results in strength and toughness insufficiency and friction material wear.

In the table, Nos. 1 through 10 represent sintered components of the invention, while Nos. 11 through 18 represent comparative components. Friction test results with respect to alloy Nos. 1 through 10 are satisfactory as shown in Table 3.

Test results with respect to comparative materials are as follows:

11: Matrix strength is insufficient because the Sn content is small or only 2%, so that the friction material is worn and penetrated, which results in an increase in μ value.

12: The Sn content is as large as 35%, so that the matrix becomes so much hardened that the counterpart S35C material is attacked and penetrated, which results in an increase in μ value.

13: The proportion of hard particles is small or only 10 wt %; therefore, no sufficient μ value can be obtained.

14: The hard particle content is large on the order of 30 wt %, so that hard particles attack the counterpart material and penetrate thereinto, which results in increased μ value.

15: Since the sintered component has no solid lubricant content, contact movement under high speed condition results in friction coefficient variations.

16: Because of 0% vacancy, no oil film (oil reservoir) is formed and fusion with the counterpart material is unavoidable.

17: Since respective powders having specified ingredients are simply mixed without being subjected to mechanical grinding/mixing, followed by sintering, no reaction layer is formed between the hard particles and the matrix. This, coupled with the fact that there are present very coarse hard particles, causes hard particles to come off the matrix during contact movement, so that fusion with the counterpart material occurs, which results in an increase in μ value.

18: Since respective powders having specified ingredients are simply mixed without being subjected to mechanical grinding/mixing, followed by sintering, no reaction layer is formed between the hard particles and the matrix. This, coupled with the fact that there are present very coarse hard particles, causes hard particles to come off the matrix during contact movement, so that fusion with the counterpart material occurs, which results in an increase in μ value.

Alloy compositions of sintered contact components according to the invention and of comparative materials are shown in Table 4. Mechanical characteristics of the sintered contact components, and abrasion test results (friction coefficient and quantities of wear with respect to sintered materials and counterpart material SS41) are shown in Table 5.

Sample powders were molded and sintered under manufacturing conditions according to the respective processes shown in FIG. 1. (In the figure, "Mechanical grinding/mixing" means mechanical alloying, mechanical mixing, and pelletizing.) Abrasion tests were carried out employing the dry abrasion tester shown in FIG. 2. For friction coefficient values, measurements were made at time intervals of one minute beginning from the start of testing, and stable measurements are shown in the table.

In Table 5, Nos. 1 through 8 represent sintered components of the invention, while Nos. 9 through 11 represent comparative materials. It is noted that only vacancy measurements are expressed in vol % and all other measurements are expressed in wt %. Symbols A and B for graphite powders signify respectively: A for natural scaly graphite powder, and B for expanded graphite powder.

TABLE 4

| No. | Process | Sn | Hard Particle | | | | | | Graphite powder | | | Vacancy | Cu | Remark |
| | | | FeMo | FeCr | FeW | FeTi | FeB | Total | A | B | Total | vol % | | |
|---|---|---|---|---|---|---|---|---|---|---|---|---|---|---|
| 1 | a | 10 | 20 | 0 | 0 | 0 | 0 | 20 | 2 | 0 | 2 | 18 | Balance | |
| 2 | a | 10 | 20 | 0 | 0 | 0 | 0 | 20 | 0 | 2 | 2 | 18 | Balance | |
| 3 | a | 10 | 20 | 0 | 0 | 0 | 0 | 20 | 10 | 0 | 10 | 20 | Balance | |
| 4 | a | 10 | 20 | 0 | 0 | 0 | 0 | 20 | 0 | 8 | 8 | 20 | Balance | |
| 5 | a | 10 | 20 | 0 | 0 | 0 | 0 | 20 | 14 | 0 | 14 | 20 | Balance | |
| 6 | b | 10 | 20 | 0 | 0 | 0 | 0 | 20 | 0 | 12 | 12 | 15 | Balance | |
| 7 | c | 10 | 20 | 0 | 0 | 0 | 0 | 20 | 5 | 3 | 8 | 25 | Balance | |
| 8 | b | 10 | 20 | 0 | 0 | 0 | 0 | 20 | 8 | 5 | 13 | 25 | Balance | |
| 9 | c | 10 | 20 | 0 | 0 | 0 | 0 | 20 | 17 | 0 | 17 | 20 | Balance | |
| 10 | d | 10 | 20 | 0 | 0 | 0 | 0 | 20 | 0 | 20 | 20 | 20 | Balance | |
| 11 | d | 10 | 20 | 0 | 0 | 0 | 0 | 20 | 10 | 8 | 18 | 20 | Balance | |

TABLE 5

| Sample No. | Mechanical Property | | | Friction Contact Characteristic | | | | |
| | UTS MPa | Elongation % | Breaking strength MPa | μ value | Δ μ[1] | Wear[2] mg | | Damage Condition |
| | | | | | | Sintered material | SS41 | |
|---|---|---|---|---|---|---|---|---|
| 1 | 288 | 6.7 | 390 | 0.52 | 0.03 | 4 | 3 | No damage |
| 2 | 275 | 5.8 | 366 | 0.50 | 0.02 | 4 | 2 | No damage |
| 3 | 198 | 4.2 | 321 | 0.48 | 0.02 | 4 | 3 | No damage |
| 4 | 196 | 4.0 | 325 | 0.48 | 0.02 | 4 | 3 | No damage |
| 5 | 186 | 4.1 | 308 | 0.47 | 0.02 | 6 | 3 | No damage |
| 6 | 190 | 3.8 | 310 | 0.47 | 0.02 | 5 | 2 | No damage |
| 7 | 199 | 3.5 | 318 | 0.49 | 0.02 | 4 | 3 | No damage |
| 8 | 189 | 3.6 | 311 | 0.46 | 0.02 | 4 | 2 | No damage |
| 9 | 154 | 1.8 | 265 | 0.44 | 0.02 | $5 \times 10^3$ | 3 | Partially broken off |
| 10 | 130 | 1.2 | 223 | 0.41 | 0.02 | $2 \times 10^4$ | 2 | Partially broken off |
| 11 | 144 | 1.6 | 241 | 0.42 | 0.02 | $6 \times 10^3$ | 2 | Partially broken off |

[1] Δ μ indicates the difference between static coefficients of friction and dynamic coefficient of friction.
[2] Minus (−) sign indicates increase by deposition Mechanical characteristics and results of friction tests of Nos. 1 through 8, which represent sintered contact components of the invention, are found satisfactory as can be seen from Table 5. Also, it has been found that scaly graphite powder and expanded graphite powder can be used in combination. Whilst, with comparative material Nos. 9 to 11, wherein the proportion of graphite powder used exceeds 15 wt %, the mechanical characteristics of the sintered material is found unfavorably low. Therefore, partial breaking-off occurred with the comparative samples during friction test.

Figure 2:
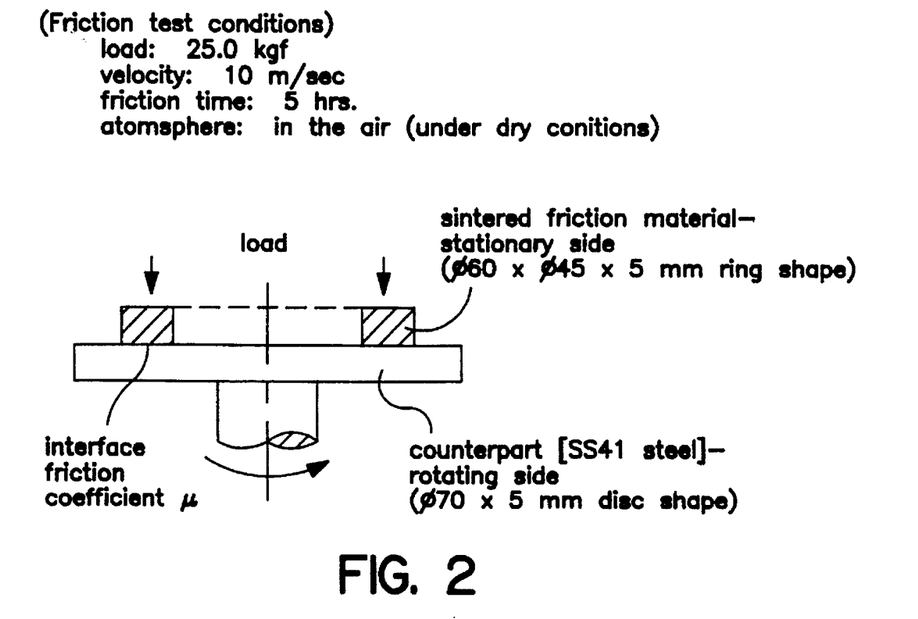
FIG. 2 is an explanatory view showing how dry friction tests are carried out with respect to sintered contact components of the invention.
Figure 4:
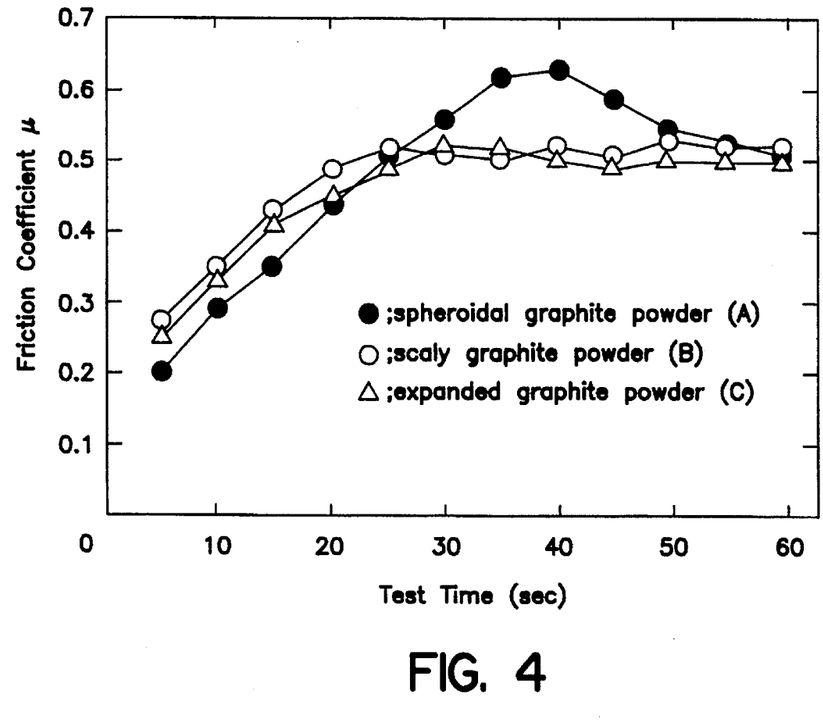
FIG. 4 is a graph showing changes in coefficient of kinetic friction in dry friction tests.

Friction contact characteristics of sintered contact components of the invention were evaluated using the dry friction tester shown in FIG. 2, with respect to both the case in which spheroidal graphite powder is used and the case in which scaly graphite powder or expanded graphite powder is used. No. 11 sample in Table 1 which represents a sintered component incorporating spheroidal graphite powder is designated A, and Nos. 1 and 2 samples in Table 4 which represent sintered components using scaly graphite powder or expanded graphite powder are designated B and C. Changes in dynamnic coefficient of friction as measured in 5-second intervals beginning right after the start of testing are shown as test results in Table 6 and FIG. 4.

TABLE 6

| No. | Time (sec) lapsed after the start of testing | | | | | | | | | | | |
|---|---|---|---|---|---|---|---|---|---|---|---|---|
|  | 5 | 10 | 15 | 20 | 25 | 30 | 35 | 40 | 45 | 50 | 55 | 60 |
| A | 0.20 | 0.29 | 0.35 | 0.44 | 0.51 | 0.56 | 0.62 | 0.63 | 0.59 | 0.55 | 0.53 | 0.51 |
| B | 0.27 | 0.35 | 0.43 | 0.49 | 0.52 | 0.51 | 0.50 | 0.52 | 0.51 | 0.53 | 0.52 | 0.52 |
| C | 0.25 | 0.33 | 0.41 | 0.45 | 0.49 | 0.52 | 0.52 | 0.50 | 0.49 | 0.50 | 0.50 | 0.50 |

As may be understood from the table, in contrast to the case where conventional spheroidal graphite powder is used, the sintered component in which scaly graphite powder or expanded graphite powder is used is not subject to any such temporary rise in friction coefficient (initial break-in phenomenon) as is seen in the first mentioned case during an initial stage after the start of testing. This ensures good stability in friction coefficient beginning from an initial stage of contact movement.

The bronze-based sintered contact component of the present invention has self-lubricating characteristics, and this enables a comparatively high friction coefficient of about 0.4 to 0.6 to be stably maintained under dry friction contact conditions, and more than 0.1 under wet friction contact conditions. The contact component is not likely to attack the counterpart material, nor is it liable to come into fusion with the counterpart. Further, the sintered component has good mechanical characteristics, such as strength, toughness, and hardness; accordingly, it can be used singly as structural material. Therefore, the sintered component of the invention can be used in various applications, including clutch material for compressors, and braking friction material for automobiles, autocycles, and other vehicles. It is also applicable to wet contact members, such as automotive transmission clutches.

What is claimed is:

1. A sintered contact component comprising a copper-based sintered alloy having a structure such that 15 to 25 wt % of a hard particulate material having a maximum particle diameter of not more than 15 μm and a mean particle diameter of not more than 5 μm is uniformly dispersed in former powder particles within an alloy matrix, the sintered contact component having a friction coefficient of not less than 0.4 when in contact with steel material under dry ambient conditions and a friction coefficient of not less than 0.1 when in contact with steel material in lubricating oil.

2. A sintered contact component as defined in claim 1, wherein when the component comes into contact with steel material under dry ambient conditions, the difference between its coefficient of static friction and its coefficient of dynamic friction is not more than 0.1.

3. A sintered contact component as defined in claim 1, wherein the copper-based sintered alloy comprises vacancies having a mean diameter of not more than 30 μm which are uniformly dispersed within the alloy in a range of from 1 vol % to 30 vol %.

4. A sintered contact component as defined in claim 1, wherein the matrix of the copper-based sintered alloy comprises 3 to 20 wt % of Sn, with the balance being made up substantially of Cu and unavoidable impurities.

5. A sintered contact component as defined in claim 1, wherein the hard particulate material is composed of at least one, or more than one, of iron-based intermetallic compounds including FeMo, FeCr, FeTi, FeW, and FeB.

6. A sintered contact component as defined in claim 1, wherein the copper-based sintered alloy contains not more than 3 wt % of a solid lubricating material as required.

7. A sintered contact component as defined in claim 6, wherein the solid lubricating material is composed of at least one, or more than one, of spherical graphite, $MoS_2$, $CaF_2$ and BN.

8. A sintered contact component as defined in claim 1, wherein the copper-based sintered alloy contains not more than 15 wt % of natural scaly graphite powder, or expanded graphite powder that is converted from natural scaly graphite powder by expanding the same in the direction of thickness, as required.

9. A sintered contact component as defined in claim 1, wherein the copper-based sintered alloy is made from a hard-particle dispersed composite copper alloy powder comprising a mixture powder consisting of a Cu—Sn alloy powder containing 3 to 20 wt % of Sn, with the balance being substantially made up of Cu and unavoidable impurities, and 15 to 25 wt % of a hard particulate material, the mixture powder being subjected to the process of mixing and milling by one of the mechanical alloying, mechanical grinding, and pulverizing techniques so that the hard particulate material is pulverized to a maximum particle size of not more than 15 μm and a mean particle size of 5 μm and is uniformly dispersed in the Cu—Sn alloy matrix.

10. A sintered contact component as defined in claim 1 or 9, wherein the copper-based sintered alloy is made from a mixture powder consisting of the hard particle-dispersed composite copper alloy powder and not more than 3 wt % of a solid lubricating material.

11. A sintered contact component as defined in claim 9, wherein the copper-based sintered alloy is made from the hard-particle dispersed composite copper alloy powder and, in combination therewith, not more than 15 wt % of natural scaly graphite powder, or expanded graphite powder that is converted from natural scaly graphite powder by expanding the same in the direction of thickness.

12. A sintered contact component as defined in claim 1, wherein the copper-based sintered alloy is made from a hard-particle dispersed composite copper alloy powder comprising a mixture powder consisting of 3 to 20 wt % of Sn, and 15 to 25 wt % of hard particulate material, with the balance being substantially made up of Cu and unavoidable impurities, the mixture powder being subjected to the process of mixing and milling by one of the mechanical alloying, mechanical grinding, and pulverizing techniques so that the hard particulate material is pulverized to a maximum particle size of not more than 15 μm and a mean particle size of 5 μm and is uniformly dispersed in the Cu—Sn alloy matrix.

13. A sintered contact component as defined in claim 1 or 12, wherein the copper-based sintered alloy is made from a mixture powder comprising the hard-particle dispersed composite copper alloy powder and not more than 3 wt % of solid lubricating material.

14. A sintered contact component as defined in claim 12, wherein the copper-based sintered alloy is made from a mixture powder comprising the hard-particle dispersed composite copper alloy powder and not more than 15 wt % of natural scaly graphite particles, or expanded graphite powder that is converted from natural scaly graphite particles by expanding the same in the direction of thickness.

* * * * *